United States Patent

Alliger

[11] 3,763,634
[45] Oct. 9, 1973

[54] AIR POLLUTION ABATEMENT APPARATUS

[76] Inventor: Howard Alliger, 10 Ponderosa Dr., Melville, N.Y.

[22] Filed: June 24, 1968

[21] Appl. No.: 739,500

Related U.S. Application Data

[63] Continuation-in-part of Ser. No. 594,844, Nov. 16, 1966, Pat. No. 3,390,869, and a continuation-in-part of Ser. No. 645,948, June 14, 1967, Pat. No. 3,389,971.

[52] U.S. Cl.......... 55/223, 55/233, 55/259, 55/277, 261/118
[51] Int. Cl. .................................. B01d 47/06
[58] Field of Search.............. 55/233, 259, 223, 55/277; 137/116 A; 239/4, 102; 159/1 A; 261/118

[56] References Cited
UNITED STATES PATENTS

| | | | |
|---|---|---|---|
| 3,081,946 | 3/1963 | Soloff | 239/4 |
| 3,456,928 | 7/1969 | Selway | 261/115 |
| 1,479,270 | 1/1924 | Wolcott | 55/122 |
| 2,646,263 | 7/1953 | Goldberg | 55/233 |
| 3,026,966 | 3/1962 | Asklof | 55/15 |
| 3,117,551 | 1/1964 | Fortman et al. | 55/15 |
| 3,212,235 | 10/1965 | Markant | 261/118 |
| 3,226,029 | 12/1965 | Goodman et al. | 239/4 |
| 3,326,467 | 6/1967 | Fortman | 116/137 A |
| 3,389,971 | 6/1968 | Alliger | 261/17 |
| 3,406,953 | 10/1968 | Moore | 55/233 |

Primary Examiner—Bernard Nozick
Attorney—Kenneth S. Goldfarb

[57] ABSTRACT

An air pollution abatement apparatus for removing soot and noxious materials comprising means for delivering a finely divided mist and ultrasonic vibrations into an exhaust for absorbing and rendering more soluble in the mist various noxious materials. A de-mister including a pair of adjacent screens and header means for delivering water between the screen is provided for disposal of the noxious materials.

2 Claims, 1 Drawing Figure

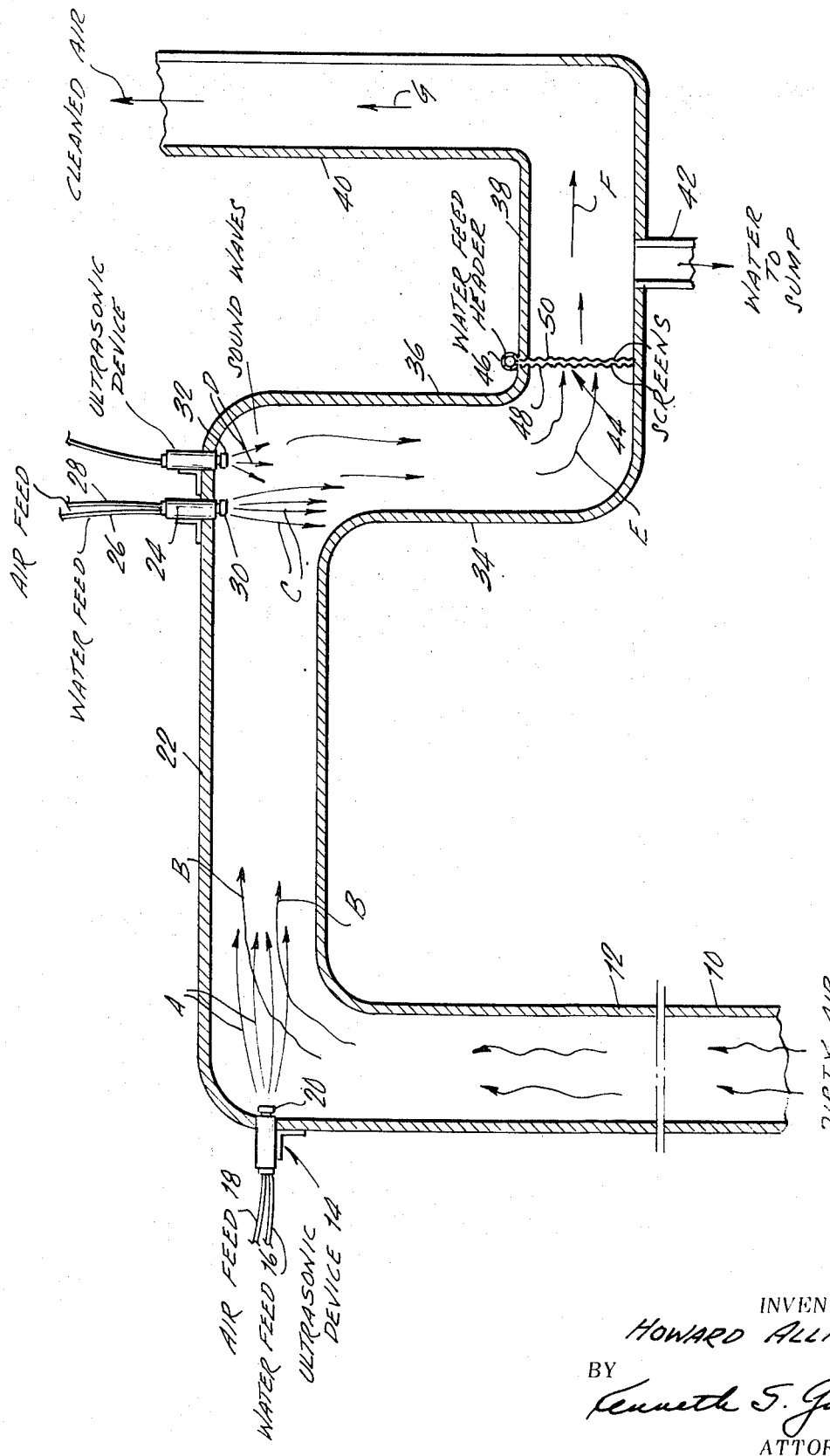

AIR POLLUTION ABATEMENT APPARATUS

This invention relates to the air pollution abatement apparatus and is a continuation in part of the applications of Howard Alliger, Ser. No. 594,844, filed Nov. 16, 1966 now U.S. Pat. NO. 3,390,869 for "Spray-Type Soot Eliminator," and of Ser. No. 645,948, filed June 14, 1967 now U.S. Pat. No. 3,389,971 for "Spray-Type Soot Eliminator."

Various types of gas scrubber and anti-pollution devices have been previously utilized in attempts to reduce air pollution arising from soot and noxious matter being disposed in the atmosphere from the combustion of various fuels or waste matter especially for industrial purposes. However, these prior art devices are usually quite complicated and expensive employing various delicate moving parts, swirls, huge amounts of water, packing wheels, filters, louvers, cyclones and other elements which generally required regular cleaning and frequent maintenance. Further, these devices did not serve to completely dispose of the soot and noxious material but merely screened part thereof from the atmosphere requiring other apparatus for disposal purposes.

It is therefore an object of the present invention to provide means for eliminating from combustion gases substantially all of the soot and noxious material such as sulfur dioxide while simultaneously providing a vehicle for the convenient and complete disposal thereof.

A further object of the invention is to provide an air pollution abatement apparatus which employs means for injecting fine mists perpendicular to each other using ultrasonics for not only increasing grain loading of the soot, but which makes the soot sticky and grow in size.

The advantages of the invention reside in the fact that this air pollution abatement apparatus eliminates the need of a large chimney, uses no moving parts, uses no chemical additions, eliminates the need for sealing the system which will work with a large range of combustion velocities and volumes, and which employs the use of a waterfall between screens for de-misting.

The present invention features the use of sprays which are directed across the path of dirty air or gases and which are arranged at right angles to each other. A mist made up of very fine particles is used so that the dirty air or gases including soot flow into a first moving mist rather than bounce off. A second moving mist is arranged normal to the path of the first moving mist. An application of ultrasonic energy causes the soot and noxious material to combine with the mist since the ultrasonic vibrations breaks down the surface tension of the liquid droplets and permits the furious combination of the noxious material and soot with the droplets. These droplets pass into engagement with the second moving mist for particle agglomeration and thence through a novel de-mister for separation of the mist and particles from the cleaned air ang gases.

These, together with the various ancillary objects and features which will become apparent as the following description proceeds are attained by this spray-type soot eliminator, a preferred embodiment being shown in the accompanying drawing, by way of example only, wherein:

The FIGURE is a schematic vertical sectional view of the air pollution abatement apparatus.

With continuing reference to the drawing as the following specification proceeds, reference numeral 10 generally desigantes a conduit in the form of a chimney, air ducts, or the like having cylindrical walls 12. There is no need for a chimney of an extended height should the present invention be for the purpose of cleaning the gases of combustion.

Mounted in the walll 12 is a spray nozzle generally indicated at 14. In operation, water is fed in through delivery conduit 16. The water is fed at a rate of between 0.1 and 3.5 lbs. per minute. Compressed gas such as compressed air or steam is fed through conduit 18 at a pressure ranging from 40 to 100 lbs. per square inch. The nozzle 14 is provided with an ultrasonic resonator or whistle 20 which provides for a minimum particle size and a fine mist spray. The particle size is in the order of 1 to 30 microns means mass diameter and is directed in the direction of arrows A across the conduit 10 diametrically and into a disposed tube communicating with and extending horizontally and normally to the conduit 10. The disposable tube 22 is diametrically opposed to nozzle 14 and is in horizontal alignment therewith so that the mist passes therethrough in the direction of arrow B.

This action is enhanced by the addition of the sonic whistle 20 or siren whose sound waves cause soot particles to vibrate and agglomerate.

Mounted in the disposal tube 22 is a spray nozzle 24 having a water feed 26 and an air fed 28 and functioning similar to the spray nozzle 14. The spray nozzle 24 is provided with an ultrasonic whistle 30 similar to the whistle 20. A further ultrasonic whistle 32 is mounted in the disposal tube. The spray nozzle directs a fine mist spray generally in the direction of arrow C transverse to the direction B of the mist and agglomerated soot and noxious material so as to insure greater stickness of the soot and greater particle agglomeration which is also enhanced by the sound waves D emanating from the whistle 32. The fine mist and accompanying soot then descends through a suitable fluid disposal means 34 in the form of any suitable tube or conduit. The disposal means 34 includes not only the vertical portion 36 but a horizontal portion 38 which terminates in a clear air disposal tube 40. Connected to the horizontal portion 38 of the fluid disposal means is a pipe 42 for delivering water to a sump.

A de-mister generally indicated by reference numeral 44 is disposed in the horizontal portion 38 of the fluid disposal means which includes a fluid header 46 through which water is fed and allowed to trickle downwardly between a pair of screen 48 and 50 which are closely adjacent or abut each other to the extent that the fluid from the header forms a substantially complete front to the mist and agglomerated particles as well as gases passing through the screen in the direction indicated by arrows E so that the water in the screen will take out all of the mist and soot, and allow only the clean gases to pass in the direction of arrow F and G through the clean air tube 40. The water and entrapped soot and noxious materials then passes through the pipe 42 to the sump.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. An air pollution abatement apparatus for removing soot and noxious material from gases comprising a conduit for receiving gases to be scrubbed, a disposal tube communicating with and extending normal to said conduit, fluid disposal means connected to said disposal tube, spray nozzle means mounted in said conduit spaced from and in alignment with said disposal tube and including means for simultaneously delivering a mist in a fine spray into said conduit and across the path of said gases and into said disposal tube for separating soot and noxious material from said gases and for directing said soot and noxious material into said disposal tube, a waterfall below said disposal tube and between said disposal tube and said fluid disposal means for de-misting said gases, said spray nozzle means being located in advance of said waterfall, and a clean gas dispersal conduit connected to said disposal tube.

2. An apparatus for removing soot and noxious material from gases comprising a conduit for receiving gases to be scrubbed, a disposal tube communicating with and extending normal to said conduit, fluid disposal means connected to said disposal tube, first spray nozzle means mounted in said conduit spaced from and in alignment with said disposal tube and including means for simultaneously delivering in a first flow pattern a gas, a liquid and ultrasonic vibrations into said conduit and across path of said gases and into said disposal tube for separating soot and noxious material from said gases and directing said soot and noxious material into said disposal tube, second spray nozzle means mounted in said disposal tube and including means for simultaneously delivering in a second flow pattern normal to said first flow pattern a gas, a liquid and ultrasonic vibrations into said disposal tube further wetting soot and noxious material carried in said first flow pattern and for directing said further wetted soot and noxious material into said fluid disposal means, a waterfall below said disposal tube and between said disposal tube and said fluid disposal means for de-misting said gases, said waterfall extending transverse to said fluid disposal means, said first and second spray nozzle means being located in advance of said waterfall, and a clean gas dispersal conduit connected to said disposal tube.

* * * * *